Figure 1:
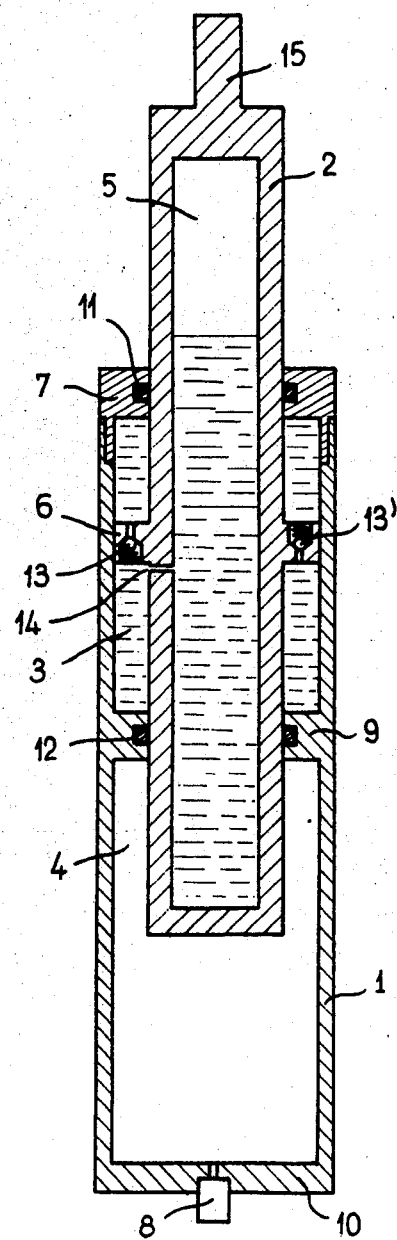

United States Patent [19]
Dachicourt et al.

[11] 3,970,292
[45] July 20, 1976

[54] OIL AND AIR SUSPENSION DEVICES

[75] Inventors: Augustin Dachicourt; René Krin, both of Boulogne-Billancourt, France

[73] Assignees: Regie Nationale des Usines Renault, Boulogne-Billancourt; Automobiles Peugeot, Paris, both of France

[22] Filed: Mar. 13, 1975

[21] Appl. No.: 557,972

[30] Foreign Application Priority Data
Mar. 14, 1974 France .............................. 74.08650

[52] U.S. Cl. ............................. 267/64 R; 188/286; 188/315
[51] Int. Cl.² ............................................ F16F 5/00
[58] Field of Search ................ 267/64 R, 64 A, 124, 267/129; 188/286, 315

[56] References Cited
UNITED STATES PATENTS

| | | | |
|---|---|---|---|
| 3,533,613 | 10/1970 | Bendicsen .......................... | 267/64 R |
| 3,751,023 | 8/1973 | Thomas ............................. | 267/64 R |
| 3,820,818 | 6/1974 | Kress et al. ....................... | 267/64 R |

*Primary Examiner*—James B. Marbert
*Attorney, Agent, or Firm*—Fleit & Jacobson

[57] ABSTRACT

The invention relates to an air and oil suspension device notably for motor vehicles adapted to act both as a shock absorber and as a pneumatic spring. It comprises means for compensating the expansion of the fluids contained therein in case of temperature increment. In a cylinder divided into two chambers one containing a gas and the other a hydraulic fluid is slidably mounted another hollow cylinder closed at both ends and containing essentially a hydraulic fluid and a reduced volume of gas under pressure. This second cylinder has an integral external piston-forming flange provided with opposite non-return valves permitting the passage in either direction of the hydraulic fluid which is thus caused to undergo a substantial loss of pressure, and at least one opening through the wall of said second cylinder under said flange so that the pressures can balance each other on either side of the wall of said second cylinder.

2 Claims, 2 Drawing Figures

U.S. Patent  July 20, 1976  3,970,292

OIL AND AIR SUSPENSION DEVICES

The present invention relates in general to suspension devices, notably for motor vehicles and has specific references to an oil and air suspension device adapted to absorb satisfactory conditions variations in the liquid and gas volumes which are due to a change of temperature.

In fact, either during its operation or in service in a relatively warm or cold climate, the temperature of a shock absorber or like oil and air suspension device tends to increase or decrease considerably. In this case, the expansion or contraction of the liquid within the suspension element, plus the expansion or contraction of the gas acting as a pneumatic spring therein, tend to modify the relative position of the piston and cylinder components of the device. If the shock absorber or suspension device is disposed between the wheels or axles of a vehicle and the body thereof, this expansion or contraction is attended by an upward or downward movement of the vehicle body, the magnitude of this movement being far from negligible, for example of the order of one inch for a 30° C temperature difference.

It is the primary object of the present invention to avoid this inconvenience by providing in an oil and air suspension device of this character compensating means such that any temperature increment or decrement will not involve any change in the trim of the vehicle.

Basically, this invention is directed to provide an oil and air suspension device for motor vehicles which is capable of performing the dual function of hydraulic shock absorber and pneumatic spring or damping device, and comprises means for compensating the expansion of at least one of the fluids contained therein under the influence of a temperature increment, this device being characterised in that it comprises a first cylinder divided into two chambers one containing a gas and the other a hydraulic fluid, and a second cylinder movable within said chambers, said second cylinder being closed at both ends and containing essentially hydraulic fluid and a reduced volume of gas under pressure, said second cylinder comprising a piston-forming flange incorporating non-return valves for controlling the flow of said hydraulic damping fluid in either direction, at least one opening being provided in said second cylinder on one side of said flange so that the pressures can balance each other on either side of the wall of said second cylinder.

Figure 2:
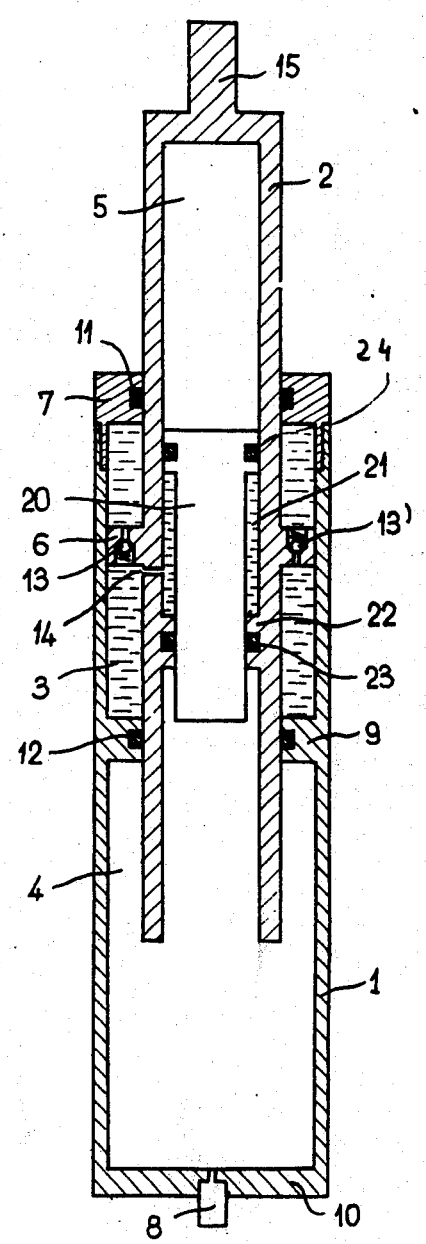

Reference will now be made to the attached drawing of which:

FIG. 1 is a diagrammatic axial section illustrating a first form of embodiment of the invention which permits of absorbing the increment in the oil volume, and FIG. 2 is a similar view of a modified form of embodiment permitting the absorption of the increment in the volumes of oil and gas.

Referring first to FIG. 1, it will be seen that the oil and air suspension device according to this invention comprises an external tubular body 1 having its ends closed by a bottom 10 provided with a valve 8 and by a plug 7 formed with a central passage or aperture having a piston packing 11 fitted therein, respectively. This tubular body 1 is divided into two chambers or compartments 3 and 4 bounded by a central fixed partition 9 also formed with a central aperture provided with a piston packing 12. Said chambers 3 and 4 are filled, the former with a hydraulic fluid such as oil of the grade and composition usually employed in shock absorbers, and the latter with an inert gas such as nitrogen under pressure, introduced through said valve 8.

Slidably fitted in said tubular body 1 at the level of said plug 7 and central partition 9 is a second internal hollow or tubular cylinder 2 closed at both ends and formed approximately at mid-length with an external piston-forming flange 6 limiting the permissible axial stroke of this internal or second cylinder 2. Parallel to the axis of this assembly are a pair of non-return valves 13 and 13', acting in opposition to each other, and disposed in passages formed through said flange 6.

On the other hand, at least one opening 14 is formed below said flange 6 to permit the balancing of pressures on either side of said internal cylinder 2.

The inner space of this second cylinder 2 is partially filled with the same liquid as that contained in chamber 3; however, the upper portion of this inner space contains gas 5 under pressure.

This internal or second cylinder 2 is connected to the body or chassis of the vehicle (not shown), and the outer tubular body or cylinder 1 is rigid with a wheel supporting arm (not shown).

The upper portion of this tubular body 1 operates like a conventional shock absorber in that when a shock is produced in the upward direction in the device shown in FIG. 1 an overpressure develops in the liquid contained in the lower portion, i.e. under the piston-forming flange 6, of cavity 3, and through the non-return valves 13' permitting the passage of fluid in the proper direction, this fluid is transferred to the upper portion of said cavity 3 (with respect to the flange 6).

A shock exerted in the opposite direction, i.e. downwards, would have the same consequence and produce a transfer of liquid in the opposite direction through the proper valves 13.

It is worth pointing out that the passage holes or holes 14 are so calibrated that the loss of pressure through these holes is greater than that caused by the flow of liquid through valves 13', so that most of said liquid will flow preferentially through these valves 13' instead of through the second tubular cylinder 2.

The lower portion of tube 1 acts as a pneumatic "spring" by working on the compressibility of the gas under pressure contained in its chamber 4.

Now let us consider what happens when a temperature increment takes place within the device, for example as a consequence of a repeated operation or in case of relatively high environmental temperature.

In this case, the volume of liquid contained in chamber 3 of cylinder 1 increases by a certain amount AV which can flow out gradually through the opening or openings 14 into the second tubular cylinder 2.

This fluid input is tolerated due to the presence of gas 5 which can accept this excess volume AV on account of its inherent compressibility.

It will be noted that in this case the volume increment AV due to the liquid is absorbed by the device of this invention without entailing any change in the respective positions of the two cylinders 1 and 2, in contrast to what is observed in a conventional shock absorber.

Moreover, the tightness between the volume of gas under pressure in chamber 4 and the external atmosphere is obtained not only by the provision of packings or seals 11 and 12 but also through the presence of the liquid contained in chamber 3, this arrangement being consequently considerably more advantageous than in the case of a fluid tightness to be obtained between two gaseous atmospheres separated from each other only by conventional seals or packings.

FIG. 2 illustrates an improved and different arrangement meeting the same requirement of maintaining the constant trim of the vehicle irrespective of the operating temperature of the device, the latter integrating not only the expansion of the liquid in chamber 3, but also that of the gas in chamber 4.

This modified construction comprises a number of components corresponding to those of the first device shown in FIG. 1; therefore, these components are designated by the same reference numerals. However, it departs therefrom essentially in that it comprises a central compensating piston 20 and a packing 24, both contained in the hollow internal cylinder 2 provided to this end with a bearing 22 and another sealing packing 23.

It will be readily understood that the liquid contained in chamber 3 can flow through the openings 14 into a chamber 21 formed by the diameter of compensating piston 20 and the inner diameter of cylinder 2, the bearing 22 and the lower face of piston 20.

It will also be seen that the free gas-to-liquid interface between the fluids contained in said internal cylinder 2 of FIG. 1 is replaced by a material partition consisting of the faces of said piston 20.

Furthermore, the gas pressure prevailing in chamber 5 is such, with respect to the pressure exerted on the opposite face of piston 20, that this piston 20 constantly originates a pressure in the liquid filling the volume 21.

The shock-absorber and spring functions devolved to chambers 3 and 4 respectively of the device according to this invention as shown in FIG. 2 are substantially the same as, or similar to, those described hereinabove with reference to FIG. 1.

Now let us consider the operation of the device in case of temperature increment causing an increase in the volume of liquid and gas in the device.

The increment $AV^1$ of the volume of liquid contained in cavity or chamber 3 is transmitted through openings 14 to the volume 21 and the latter increases by raising the piston 20 as permitted by the compressibility of gas 5.

The volumetric increment $AV^2$ in the gas contained in chamber 4 is absorbed by the movement of piston 20 (due to the increment $AV^1$ in the oil volume contained in chambers 3 and 21), thus releasing a volume equivalent to the volume $AV^2$ in chamber 4. This is obtained by properly dimensioning the volumes and cross-sectional passage areas of the various component elements of the device of this invention.

It will be seen that with this device, it is possible to maintain at a constant level the trim of the vehicle equipped therewith by absorbing the volumetric expansions of the liquid and gas contained therein when their temperature increases.

It will be readily understood that, by symmetry, a decrease in the temperature of the device cannot change the trim of the vehicle, since the volumetric variations of the fluids are compensated in a similar manner.

Although specific forms of embodiment of the present invention have been described hereinabove and illustrated in the accompanying drawing, it will readily occur to those skilled in the art that various modifications and changes may be brought thereto without departing from the scope of the invention as set forth in the appended claims.

What is claimed as new is:

1. A hydraulic oil and air suspension device for motor vehicles comprising, in combination, a first cylinder having an interior, means for dividing the interior of said first cylinder into a pair of axially spaced chambers, a gas in one of said first cylinder chambers and a hydraulic fluid in the other of said first cylinder chambers, a second cylinder having a side wall defining an interior and closed at each end arranged for sliding movement in the interior of said first cylinder, an immiscible hydraulic fluid and pressurized gas in the interior of said second cylinder, an annular flange on the outer surface of said second cylinder slidably engageable with the inner wall of said first cylinder for guidably positioning said second cylinder for said sliding movement, a plurality of check valves in said flange for controlling the flow of hydraulic fluid in opposite directions within said first cylinder other chamber, a piston having a head and a shank slidably positioned in the interior of said second cylinder, said head being arranged for sliding sealing engagement with the inner wall of said second cylinder to separate the hydraulic fluid from the pressurized gas in said second cylinder, sealing means in said second cylinder between said piston shank and the inner wall of said second cylinder for separating the hydraulic fluid in said second cylinder from the gas in said first cylinder one chamber, said second cylinder side wall having at least one opening on one side of said flange for balancing the pressure of the hydraulic fluid between the interior of said second cylinder and said first cylinder other chamber.

2. An oil and air suspension device in accordance with claim 1 wherein said one opening has a selected cross-sectional area wherein the loss of pressure in the hydraulic fluid flowing through said opening towards the interior of said second cylinder is greater than the loss of pressure resulting from the flow of hydraulic fluid through said check valves during the relative movement of said first and second cylinders.

* * * * *